(12) United States Patent
Takikawa et al.

(10) Patent No.: US 8,286,900 B2
(45) Date of Patent: Oct. 16, 2012

(54) PROCESS FOR PRODUCING GRANULAR SOLID MATTER FROM COAL ASH AS RAW MATERIAL AND APPARATUS THEREFOR

(75) Inventors: Noboru Takikawa, Machida (JP); Yasunori Shibata, Himeji (JP); Atsushi Kondo, Kobe (JP); Tamaki Sakurai, Nagoya (JP); Yoshiteru Kato, Chuo-ku (JP); Kozo Kuga, Naruto (JP); Tomokazu Tengan, Urazoe (JP); Tatsuya Ishihara, Urazoe (JP); Atsushi Chinen, Urazoe (JP); Yoshimichi Daijyo, Chiyoda-ku (JP); Noboru Yasuda, Chiyoda-ku (JP); Masahiko Doi, Chiyoda-ku (JP)

(73) Assignees: Kawasaki Plant Systems Kabushiki Kaisha, Kobe-shi (JP); Japan Coal Energy Center, Tokyo (JP); Kawasaki Jukogyo Kabushiki Kaisha, Kobe-shi (JP)

( * ) Notice: Subject to any disclaimer, the term of this patent is extended or adjusted under 35 U.S.C. 154(b) by 442 days.

(21) Appl. No.: 12/447,235

(22) PCT Filed: Oct. 25, 2007

(86) PCT No.: PCT/JP2007/070810
§ 371 (c)(1),
(2), (4) Date: Jan. 5, 2010

(87) PCT Pub. No.: WO2008/050831
PCT Pub. Date: May 2, 2008

(65) Prior Publication Data
US 2010/0108788 A1 May 6, 2010

(30) Foreign Application Priority Data
Oct. 25, 2006 (JP) .................. 2006-289602

(51) Int. Cl.
B02C 19/00 (2006.01)
B02C 21/00 (2006.01)

(52) U.S. Cl. ............................................. 241/3; 241/21

(58) Field of Classification Search .................. 241/3, 21
See application file for complete search history.

(56) References Cited

FOREIGN PATENT DOCUMENTS

| JP | 07-280709 | 10/1995 |
| JP | 2002-211968 | 7/2002 |
| JP | 2005-138072 | 6/2005 |

OTHER PUBLICATIONS

International Search Report for PCT/JP2007/070810, mailed Dec. 4, 2007.

*Primary Examiner* — Faye Francis
(74) *Attorney, Agent, or Firm* — Marshall, Gerstein & Borun LLP (57) ABSTRACT

A method of estimating the hydration reactivity of coal ash with high precision and determining the amount of milling water for obtaining a milling product in funicular form at the stage of milling; and a molding method being free from the problem of adhesion to a pressurization board at the stage of molding after the milling. When any collected coal ash exhibits a corrected basicity (($CaO+Fe_2O_3+MgO)/SiO_2$ (weight ratio)) of 0.1 or higher and a reactivity index (corrected basicity/($R_2O/Al_2O_3$) (weight ratio)) of 10 or higher, the coal ash as a raw ash is transferred to raw ash silo (2). Otherwise, the coal ash is transferred to waste ash silo (3). The raw ash within the raw ash silo (2) is poured in mill (8), and lime and gypsum are added and further milling water is charged thereto and milled. The amount of milling water is regulated so that with respect to agitator power per weight of material milled by the mill, the ratio of (average of power during 30 to 40 sec after completion of water charging)/(power at idling) ranges from 3 to 4, and so that with respect to agitator power per weight of material milled during 30 to 90 sec after completion of water charging, the ratio of (width of power fluctuation)/(average of power) ranges from 0.1 to 0.3.

6 Claims, 3 Drawing Sheets

PROCESS FOR PRODUCING GRANULAR SOLID MATTER FROM COAL ASH AS RAW MATERIAL AND APPARATUS THEREFOR

TECHNICAL FIELD

The present invention relates to a process for producing a granular solid material from a coal ash as a raw material, and an apparatus for the same. More specifically, the present invention relates to a process and an apparatus in which: a coal ash is sorted depending on its corrected basicity and reactivity index; an additive such as lime, gypsum or the like is added thereto; a kneaded material in the funicular state is obtained while adjusting the amount of charged water for kneading depending upon the agitator motive power of the kneading machine; the kneaded material is subjected to vibration molding, followed by curing to allow the material to be solidified; and the solid material is thereafter crushed to give a granular solid material. Thus resulting granular solid material can be effectively utilized in applications such as roadbed materials, embankment materials, refilling materials, backfilling materials, soil improving materials, humidity conditioning materials for use in greenhouses and underfloors, and the like.

BACKGROUND ART

Processes for solidifying a coal ash with a hydration reaction by adding an additive such as lime (slaked lime, quick lime), cement, slag or gypsum are well known, and the hydrating reactivity of the coal ash has been known to correlate with its CaO quantity, basicity ($CaO/SiO_2$) and the like to some extent (for example, Patent Document 1, claim 1). However, it is difficult to estimate the hydrating reactivity of the coal ash with some accuracy, based merely on the CaO quantity or basicity.

In addition, when a kneaded material is obtained by adding an additive and water for kneading to a coal ash, it is desired to obtain the kneaded material in the funicular state constantly. In a known process to meet this end, a small amount of water is added first, and the extent of rise in the agitator motive power of the kneading machine resulting from the addition is used for estimating the finally needed amount of water for kneading, whereby the water for kneading is added in an amount based on the estimated amount that suggests the deficient amount to be added (for example, Patent Document 1, claims 6 and 7). However, according to this process, the estimated amount of water to be charged may vary fairly broadly, and thus more accurate process for determining the estimated amount of water for kneading has been desired.

Furthermore, for obtaining molded products of a kneaded material, as is employed in the case of producing concrete blocks, known methods may involve: a process in which powder cement, aggregate and the like are kneaded with water to form a kneaded material in the pendular state, which is molded under a low pressure and vibration, and then subjected to demolding immediately; or a process in which ready-mixed concrete in the capillary state is solidified by vibration molding, and then subjected to demolding. However, since the hydration reaction does not proceed enough with kneaded material in the pendular state, elution of a heavy metal or the like may occur, while handling characteristics may be inferior in the case of the capillary state, thereby leading to disadvantages of deteriorated strength of the granular solid material.

Additionally, in molding after the kneading, a low-pressure vibration molding machine has been employed conventionally. Although this low-pressure vibration molding machine utilizes a loading plate for pressurization from above the mold form, the kneaded material may adhere to the loading plate depending on the amount of the water for kneading, and thus problems may be posed in that operation of the production apparatus can be hampered.

Moreover, in crushing the solid material after curing, a crushing machine is typically used to effect crushing. However, these processes are disadvantageous in that a granular solid material having a predetermined particle size cannot be obtained constantly to meet each application.

Patent Document 1: JP-A No. 2002-211968 (claims 1, 6 and 7)

DISCLOSURE OF THE INVENTION

Problems to be Solved by the Invention

The present invention was made in order to solve the foregoing problems. More specifically, an object of the present invention is to provide a process which enables the hydrating reactivity of a coal ash to be estimated with higher precision than that in conventional processes, and to provide also a process for determining the amount of water for kneading which can give a kneaded material in the funicular state by kneading. Further, another object of the present invention is to provide a forming process which is not accompanied by problems of adhesion to the loading place in molding after the kneading. In addition, yet another object of the invention is to obtain constantly a granular solid material having a predetermined particle size to meet each application.

Means for Solving the Problems

In one aspect, the process for producing a granular solid material from a coal ash as a raw material of the present invention includes: adding lime and/or gypsum as an additive to a coal ash; kneading with water; carrying out molding; curing with steaming to allow for solidifying; and crushing to obtain a granular solid material, wherein the coal ash having a corrected basicity (($CaO+Fe_2O_3+MgO)/SiO_2$ (weight ratio)) of no less than 0.1, and a reactivity index (corrected basicity/$(R_2O/Al_2O_3)^2$ (weight ratio)) of no less than 10 is used as the raw ash, in which R herein referred to represents a Na or K atom, and the formula of $R_2O=Na_2O+0.658\,K_2O$ (weight ratio) is satisfied.

Since the hydrating reactivity of a coal ash varies for each coal ash, a granular solid material not having predetermined qualities and satisfactory safety could be produced when the raw material is some among all types of the coal ash. Thus, in the present invention, a coal ash having a corrected basicity represented by ($CaO+Fe_2O_3+MgO)/SiO_2$ (weight ratio) of no less than 0.05 and no greater than 1, preferably no less than 0.1 and no greater than 0.6, and also having a reactivity index represented by (corrected basicity/$(R_2O/Al_2O_3)^2$ (weight ratio)) of no less than 10 and no greater than 50,000, preferably no less than 15 and no greater than 5,000 is sorted, which is used as the raw ash. When the coal ash has the corrected basicity of less than 0.05, low hydrating reactivity is attained, while the reactivity index of less than 10 is not preferred since the hydrating reactivity is significantly impaired. In addition, when the corrected basicity is greater than 1 and the reactivity index is greater than 50,000, such a coal ash is not suited as a raw material since lowering of the reactivity is caused due to extremely deviated state of the composition. The values of these corrected basicity and reactivity index are particularly suited when the granular solid material of the present invention is used as a raw material of roadbed materials.

The composition required for calculation of the corrected basicity and the reactivity index of a coal ash can be determined based on actual analysis results derived using the coal ash collected from an electric dust collector, a relay hopper and the like, or the coal ash collected from a coal ash transport apparatus. Alternatively, in addition to the determinations described above, the composition can be determined also by reference of a database in which the compositions of the ash contents had been stored previously for each kind of the coal.

In other aspect of the present invention, the process for producing a granular solid material includes: adding lime and/or gypsum as an additive to a coal ash; kneading with water; carrying out molding; curing with steaming to allow for solidifying; and crushing to obtain a granular solid material, the process including the steps of: (a) sorting as the raw ash a coal ash having a corrected basicity (($CaO+Fe_2O_3+MgO)/SiO_2$ (weight ratio)) of no less than 0.1, and a reactivity index (corrected basicity/$(R_2O/Al_2O_3)^2$ (weight ratio)) of no less than 10; (b) adding lime and/or gypsum to the raw ash and mixing them; (c) adding water for kneading to the mixture, and kneading using a kneading machine to obtain a kneaded material, wherein the amount of charged water for kneading is controlled such that a ratio of (average of motive power during 30 to 40 sec after completion of charging water)/(motive power in idle operation) being 3 to 4 with respect to the agitator motive power per unit weight of the kneaded material in the kneading machine, and a ratio of (fluctuation of motive power)/(average of motive power) being 0.1 to 0.3 with respect to the agitator motive power per unit weight of the kneaded material for a period of time from 30 to 90 sec after completion of charging the water are attained, whereby a kneaded material in the funicular state is obtained; (d) carrying out molding by placing the kneaded material in the funicular state into a mold form to subject to vibration molding, followed by demolding; (e) curing by steaming to obtain a solid material; and (f) crushing the solid material and adjusting the particle size.

Herein, the process according to such an aspect can be constructed to further include the step of determining the amount of the charged water for kneading beforehand by carrying out kneading of the mixture obtained in the step (b) in the kneading machine using the water for kneading as defined based on the corrected basicity of the coal ash, which enables attaining the ratio of (average of motive power during 30 to 40 sec after completion of charging water)/(motive power in idle operation) being 3 to 4 with respect to the agitator motive power per unit weight of the kneaded material in the kneading machine, and the ratio of (fluctuation of motive power)/(average of motive power) being 0.1 to 0.3 with respect to the agitator motive power per unit weight of the kneaded material for a period of time from 30 to 90 sec after completion of charging the water, and the determined amount of the charged water for kneading is employed in the step (c).

When the kneaded material is produced consistently from a coal ash with a constant amount of the water for kneading, the state of the kneaded material is not stabilized, i.e., the kneaded material in a pendular state, the kneaded material in a capillary state, and the like can be yielded depending on the nature of the coal ash, and the handlability can be deteriorated. Thus, to obtain an intended kneaded material consistently may be difficult in light of the safety (for example, possible elution of heavy metals) and the quality (for example, strength) of the granular solid material. Accordingly, to obtain the kneaded material in the funicular state consistently is contemplated in the present invention by adjusting the amount of the water for kneading with the agitator motive power of the kneading machine.

Specifically, since the greater corrected basicity of the coal ash leads to reduction of the appropriate amount of the water for kneading, the amount of the water for kneading in initial run is determined from the relationship of the amount of the water for kneading versus the corrected basicity derived beforehand. In the second and the subsequent runs, the amount of the water for kneading is adjusted based on the data obtained with the amount of the water for kneading in the initial run, on the ratio of (agitator motive power during 30 to 40 sec after completion of charging water)/(agitator motive power in idle operation) and the ratio of (fluctuation of motive power)/(average of motive power) with respect to the agitator motive power per unit weight of the kneaded material for a period of from 30 sec to 90 sec after completion of charging water, such that the ratio of (average of motive power during 30 to 40 sec after completion of charging water)/(agitator motive power in idle operation) being 3.0 to 4.0, and the ratio of (fluctuation of motive power)/(average of motive power) with respect to the agitator motive power per unit weight of the kneaded material for a period of time from 30 to 90 sec after completion of charging the water being 0.1 to 0.3 are attained, and thus the kneaded material in the funicular state is produced.

The aforementioned ratio of (average of motive power during 30 to 40 sec after completion of charging water)/(motive power in idle operation) being less than 3.0 may result in formation of the kneaded material in the pendular state, whereby the solid material after its molding and curing fails to achieve high strengths, and the amount of elution of deleterious heavy metal may exceed environmental quality standards for soil. In such cases, the amount of the water for kneading added in the subsequent run should be increased. Additionally, this ratio exceeding 4.0 may lead to failure in handling since the kneaded material in the capillary state is yielded. In such cases, the amount of the water for kneading added in the subsequent run should be decreased.

Moreover, when the ratio (fluctuation of motive power)/(average of motive power) described above is less than 0.1, sufficient agglomeration of the kneaded material cannot proceed, whereby the solid material having high strength cannot be obtained after the subsequent molding step and curing step, and the amount of elution of the deleterious heavy metal also exceeds the environmental quality standards for soil. In such cases, the amount of the water for kneading added in the subsequent run should be increased. Additionally, this ratio exceeding 0.3 may lead to failure in handling since too large agglomerate materials are produced. In such cases, the amount of the water for kneading added in the subsequent run should be decreased.

The kneaded material that gained its funicular state by kneading is typically molded by applying a comparatively low pressure using a loading plate while applying vibration. The kneaded material in the funicular state adheres to the loading plate in demolding, and thus stable demolding cannot be carried out, thereby leading to failure in obtaining finally a granular solid material having stable quality and high safety. In this respect, the kneaded material in the funicular state according to the present invention can be molded by vibration alone, i.e., without using the loading plate.

Specifically, it is preferred that the kneaded material in the funicular state be placed into a mold form in the step (d), and subjected to molding to give a block shape by applying vibration with an amplitude of 0.1 to 2 mm, at a vibration frequency of 30 to 90 times/sec for 10 to 40 sec, followed by immediate demolding.

When the amplitude is less than 0.1 mm, densification does not proceed enough, while the amplitude of no less than 2 mm results in great bubble distribution, leading to failure in yielding a uniform molded product, and thus the solid material with high strength cannot be produced after curing. Additionally, when the vibration frequency is less than 30 times/sec, the densification does not proceed enough, whereby the solid material with high strength cannot be produced after curing. In contrast, when the vibration frequency exceeds 90 times/sec, the capillary state is yielded in the mold form, thereby hampering the handling. When the vibration time period is shorter than 10 sec, the densification does not proceed enough, whereby the solid material with high strength cannot be produced after curing. To the contrary, when the vibration time period exceeds 40 sec, the bubble formation is decreased to result in the capillary state in the mold form, thereby hampering the handling.

In one aspect of the present invention, the particle size of the granular solid material is adjusted depending on the application such as, for example, roadbed materials, refilling materials, soil improving materials and the like. Specifically, it is preferred that after primary crushing of the solid material following curing is carried out in the step (f), the resultant is classified into three grades of granules falling within the particle size range of: no less than 25-40 mm; less than 25-40 mm and no less than 13-20 mm; and less than 13-20 mm, and then the granules classified into the grade of no less than 25-40 mm are crushed again, while 40 to 60% of the granules being less than 13-20 mm are subjected to secondary crushing, followed by mixing of the entirety to give the granular solid material.

For example, in the case of the crushed stone for mechanical stabilization M-40, the solid material is classified into three grades with 40 mm and 20 mm sieves. In the case of the crushed stone for mechanical stabilization M-30, the solid material is classified into three grades with 30 mm and 20 mm sieves, and in the case of the crushed stone for mechanical stabilization M-25, the solid material is classified into three grades with 30 mm and 13 mm sieves. Accordingly, the granular solid material can be adjusted to have a predetermined particle size. The distribution proportion of the granules falling within the range below 13-20 mm may be closer to 60% when the strength of the solid material is greater, while such a proportion may be closer to 40% when the strength is less, whereby more favorable particle size can be attained.

Also, in the case of, for example, crusher runs for roadbed, it is preferred that after primary crushing of the solid material following curing is carried out in the step (f), the resultant is classified into grades of the granules falling within the particle size range of no less than 10-40 mm, and less than 10-40 mm, and subsequently, the granules of no less than 10-40 mm are subjected to secondary crushing, followed by mixing of the entirety to give the granular solid material.

For example, a 40 mm sieve is used for crusher run C-40, a 30 mm sieve is used for crusher run C-30, and a 20 mm sieve is used for crusher run C-20. In the cases of backfilling materials, refilling materials and the like, a 10 mm sieve is used to attain a desired particle size.

In still other aspect of the present invention, an apparatus for producing a granular solid material from the coal ash as a raw material is provided, the production of the granular solid material including: adding lime and/or gypsum as an additive to a coal ash; kneading with water; carrying out molding; curing with steaming to allow for solidifying; and crushing to obtain a granular solid material, and the apparatus including: a sorting means for sorting as the raw ash a coal ash having a corrected basicity (($CaO+Fe_2O_3+MgO)/SiO_2$ (weight ratio)) of no less than 0.1, and a reactivity index (corrected basicity/$(R_2O/Al_2O_3)^2$ (weight ratio)) of no less than 10; a kneading machine for kneading by adding lime and/or gypsum to the raw ash and mixing them, and also adding water to obtain a kneaded material; a control unit for controlling the amount of charged water for kneading such that a ratio of (average of motive power during 30 to 40 sec after completion of charging water)/(motive power in idle operation) being 3 to 4 with respect to the agitator motive power per unit weight of the kneaded material in the kneading machine, and a ratio of (fluctuation of motive power)/(average of motive power) being 0.1 to 0.3 with respect to the agitator motive power per unit weight of the kneaded material for a period of time from 30 to 90 sec after completion of charging the water are attained; a vibration molding machine for carrying out molding by placing the kneaded material in the funicular state into a mold form; a curing machine for curing by subjecting the kneaded material demolded from the vibration molding machine to steaming, thereby obtaining a solid material; and a particle size adjusting means for crushing the solid material and adjusting the particle size.

In the vibration molding machine according to the aspect described above, it is preferred that the mold form in which the kneaded material in the funicular state was placed be allowed to vibrate with an amplitude of 0.1 to 2 mm, at a vibration frequency of 30 to 90 times/sec for 10 to 40 sec thereby achieving molding to give a block shape, followed by immediate demolding.

In the apparatus described above, the means for adjusting the particle size is preferably constructed to have a primary crushing machine for crushing the kneaded material after the curing, a sieve machine for classifying the primary crushed material into granules of three grades falling within the particle size range of: no less than 25-40 mm; less than 25-40 mm and no less than 13-20 mm; and less than 13-20 mm, a carrying machine for returning the granules of no less than 25-40 mm back again to the primary crushing machine, and a secondary crushing machine for crushing 40 to 60% of the granules less than 13-20 mm.

In the foregoings, the means for adjusting the particle size is preferably constructed to have a primary crushing machine for crushing the kneaded material after the curing, a sieve machine for classifying the primary crushed material into granules having a particle size of no less than 10-40 mm, and less than 10-40 mm, and a secondary crushing machine for crushing the granules of no less than 10-40 mm.

In the aforementioned aspect, the kneading machine is preferably provided with a load cell.

Effects of the Invention

In the process and apparatus for producing a granular solid material of the present invention, a coal ash sorted on the basis of the corrected basicity and the reactivity index is used among the coal ashes having varying characteristics depending on the type of the coal as a raw material of the coal ash, and on the boiler operation conditions. Therefore, the hydrating reactivity of a coal ash can be estimated with satisfactory precision, whereby stable production of the granular solid material with high quality, and superior safety is enabled.

In addition, since the amount of the water for kneading is adjusted in light of the corrected basicity of the coal ash, the magnitude and the fluctuation of the agitator motive power of the kneading machine, the kneaded material in the funicular state can be constantly obtained.

Furthermore, by carrying out the vibration molding of the kneaded material in the funicular state, followed by immediate demolding, the solid material can be obtained without using a loading plate, whereby the granular solid material can be produced in an economically advantageous manner.

Moreover, since the resulting solid material is subjected to crushing and classification using a primary crushing machine, a secondary crushing machine and a sieve machine in combination, a granular solid material having a particle size suited for the application can be produced.

Therefore, according to the present invention, utilization of a coal ash as materials of construction and the like which can be used on a large scale is enabled, and great contribution to construction of recycling-oriented societies can be expected.

[Description of Reference Numerals and Signs]

| | |
|---|---|
| 1, 17: | electric dust collector |
| 2, 19: | raw ash silo |
| 3, 20: | waste ash silo |
| 4, 21: | lime hopper |
| 5, 22: | gypsum hopper |
| 6, 23: | water tank |
| 7, 27: | pump |
| 8: | kneading machine equipped with load cell |
| 9, 29: | vibration molding machine |
| 10, 30: | curing machine |
| 11, 31: | primary crushing machine |
| 12, 32: | sieve machine |
| 13: | dispensing machine |
| 14, 33: | secondary crushing machine |
| 15, 35: | quality control unit |
| 16, 18: | silo switcher |
| 24, 25, 26: | weigh scale |
| 28: | kneading machine |
| 34: | automatic coal ash sampling-analyzing unit |

BEST MODE FOR CARRYING OUT THE INVENTION

Hereinafter, embodiments of the present invention are explained with reference to the drawings. Herein, "%" represents "% by weight" unless otherwise stated in particular.

Figure 1:
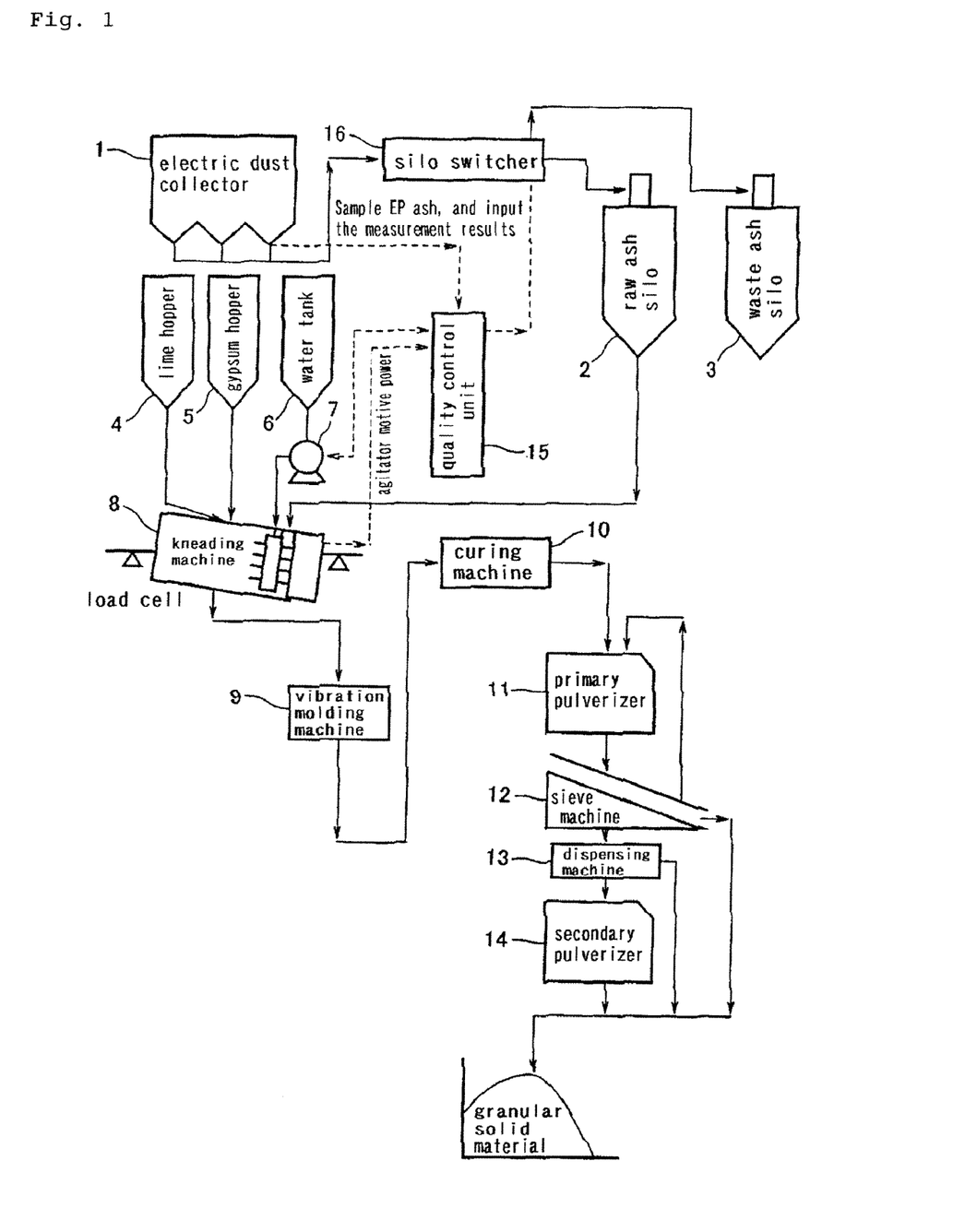
FIG. 1 shows a conceptual schematic view illustrating an apparatus for producing a granular solid material according to one embodiment of the present invention.

FIG. 1 shows a conceptual schematic view illustrating an apparatus for producing a granular solid material according to one embodiment of the present invention. The apparatus for producing a granular solid material is of a batch-wise type, which is explained below according to the order of steps. First, a coal ash is collected in electric dust collector 1, and its analysis is carried out during the coal ash is transported from the electric dust collector 1 to a silo. The analytical results are input into quality control unit 15. The quality control unit 15 calculates the corrected basicity and the reactivity index based on the input analytical results, and executes switching of silo switcher 16 on the basis of thus derived values. More specifically, the silo switcher 16 executes the switching such that the coal ash as a raw ash is sent to raw ash silo 2 when the coal ash has a corrected basicity (($CaO+Fe_2O_3+MgO)/SiO_2$ (weight ratio)) of no less than 0.1 and a reactivity index (corrected basicity/$(R_2O/Al_2O_3)^2$ (weight ratio)) of no less than 10, while the remaining coal ash is sent to waste ash silo 3. When the analysis and the calculation of the corrected basicity and the reactivity index of the of the coal ash cannot be completed until the coal ash reaches the silo switcher 16, an intermediate hopper (not shown in the figure) may be provided between the electric dust collector 1 and the silo switcher 16 to temporarily reserve the coal ash. Thus, the system may be constructed such that the coal ash is sent to either the raw ash silo 2 or the waste ash silo 3 by switching with the silo switcher 16 after completion of the analysis and calculation. Alternatively, without separately providing the raw ash silo 2 and the waste ash silo 3, any construction in which the coal ash is reserved in the silo 2 or the silo 3 before the results of the analysis and calculation are derived, and only the coal ash that exhibits the analysis and calculation results falling within the predetermined range described above is used as the raw ash is also acceptable. In this embodiment, the quality control unit 15 and the silo switching system 16 both serve as a sorting means.

Figure 3:
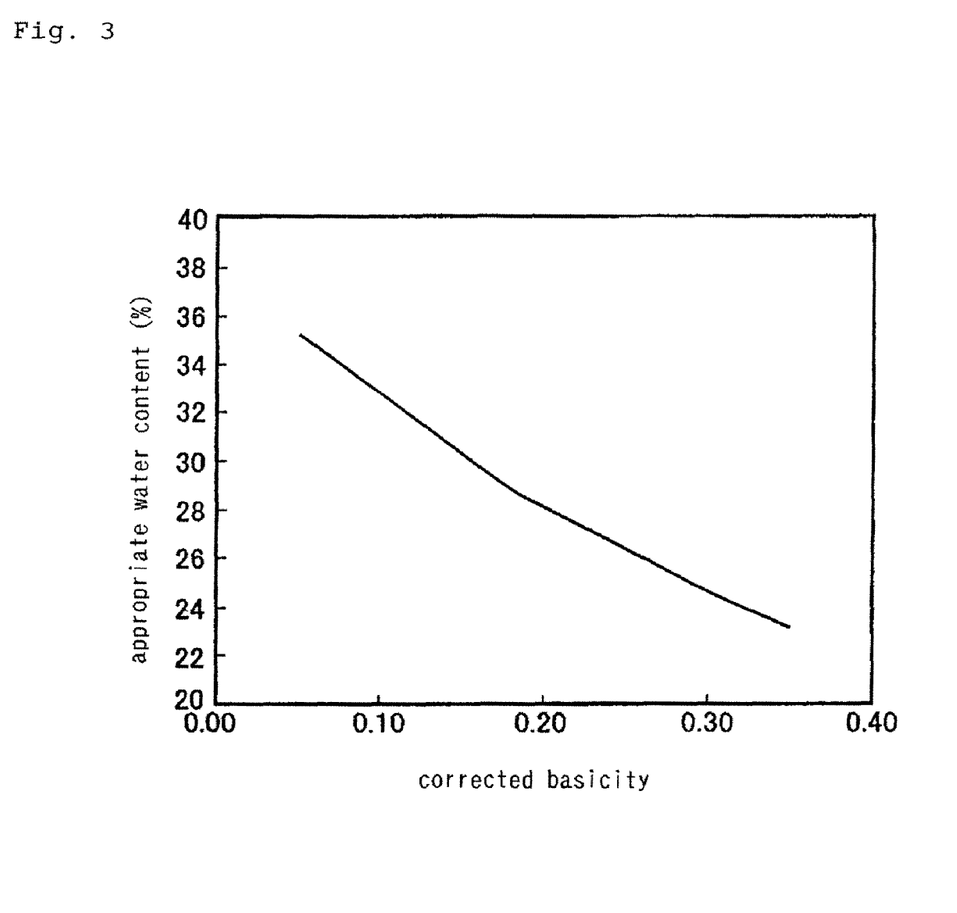
FIG. 3 shows a view drawing illustrating a calibration curve that shows a relationship of the amount of the water for kneading to be charged versus the corrected basicity of the coal ash.

Next, the raw ash in the raw ash silo 2 is charged into a kneading machine equipped with load cell 8, and just a predetermined amount is weighed. Subsequently, lime is charged into the kneading machine equipped with load cell 8 from lime hopper 4, and just a predetermined amount is weighed. Further, gypsum is charged from gypsum hopper 5, and just a predetermined amount is weighed. The water for kneading is then charged based on the corrected basicity of the raw ash. FIG. 3 shows a drawing illustrating a calibration curve for determining the amount of water for kneading to be charged on the basis of the corrected basicity of the coal ash. This calibration curve was empirically derived based on the operational results obtained hitherto. In this embodiment, the amount of water for kneading is determined based on this calibration curve shown in FIG. 3, and the corrected basicity of the raw ash derived from the analysis and calculation. The water for kneading is charged from water tank 6 using pump 7 as determined based on the calibration curve, and weighed in the kneading machine equipped with load cell 8. In this process, the value of the agitator motive power of the kneading machine 8 is transmitted to the quality control unit 15, and then verification is made as to whether or not the ratio of (average of motive power during 30 to 40 sec after completion of charging water)/(motive power in idle operation) is 3 to 4 with respect to the agitator motive power per unit weight of the kneaded material, and the ratio of (fluctuation of motive power)/(average of motive power) is 0.1 to 0.3 with respect to in the agitator motive power per unit weight of the kneaded material for a period of time from 30 to 90 sec after completion of charging the water. When the aforementioned two kinds of ratios deviate from each range described above, the amount of the charged water for kneading is regulated in the subsequent batch such that both of the aforementioned two ratios fall with in the above range. When the aforementioned two ratios fall within the above range, merely fine adjustment of the amount of the charged water for kneading is carried out in the subsequent batch, based on the motive power in the previous batch. Accordingly, the kneaded material in the funicular state can be obtained stably.

Next, the kneaded material turned to have the funicular state is fed to vibration molding machine 9 to subject to vibration molding, followed by immediate demolding. The vibration molding is carried out without using a loading plate, by applying vibration with an amplitude of 0.1 to 2 mm, at a vibration frequency of 30 to 90 times/sec for 10 to 40 sec. Accordingly, the kneaded material is molded to give a block shape. In this embodiment, the vibration molding enables the bubble included in the kneaded material to be dispersed, whereby decrease in the strength of the granular solid material due to expansion of the bubble can be suppressed.

Next, the kneaded material subjected to the vibration molding is carried into curing machine 10. In the curing machine 10, the kneaded material in the funicular state is stood in a steam atmosphere of about 60° C., and the curing by water steaming is allowed for 24 to 36 hrs. Thus, a solid material is obtained from the kneaded material by a solidifying reaction.

Subsequently, the solid material taken out from the curing machine 10 is crushed using primary crushing machine 11. Thus resulting crushed material is classified into three grades of granules falling within the particle size range of: no less than 40 mm; less than 40 mm and no less than 20 mm; and less than 20 mm with sieve machine 12. Next, those having a particle size of no less than 40 mm are charged again into the primary crushing machine 11 by a carrying apparatus (not shown in the Figure), while those having a particle size of less than 20 mm are divided into two halves by dispensing machine 13, with one half charged into secondary crushing machine 14, and each collected on the conveyer. Accordingly, a granular solid material that satisfies the requirement for the particle size of the crushed stone for mechanical stabilization M-40 is obtained. In this embodiment, the particle size adjusting means is constructed with the primary crushing machine 11, the sieve machine 12, the dispensing machine 13, the carrying apparatus, and the secondary crushing machine 14.

Figure 2:
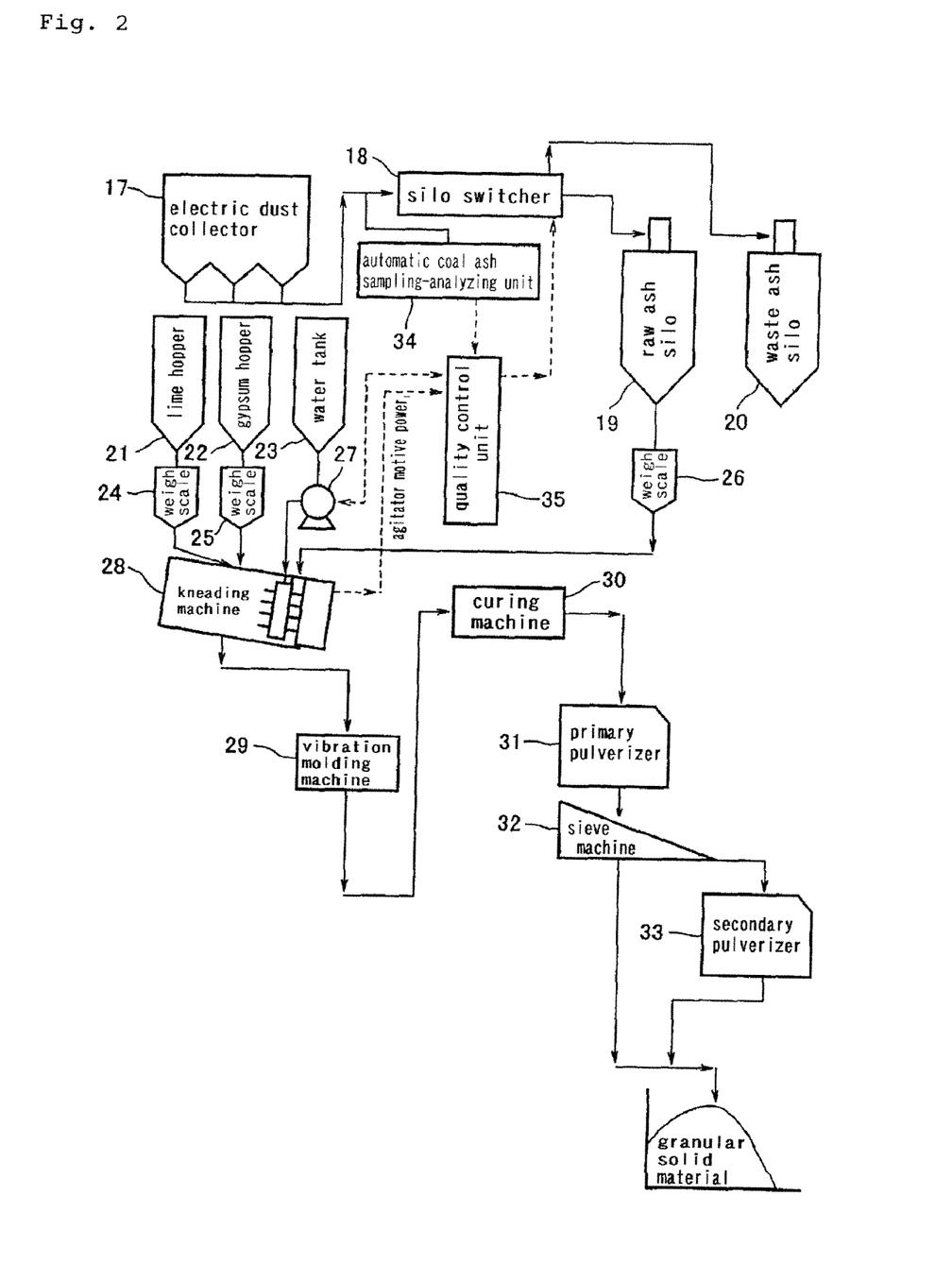
FIG. 2 shows a conceptual schematic view illustrating an apparatus for producing a granular solid material according to other embodiment of the present invention.

FIG. 2 shows a conceptual schematic view illustrating an apparatus for producing a granular solid material according to other embodiment of the present invention. The apparatus for producing a granular solid material shown in FIG. 2 is also of a batch-wise type which is similar to the apparatus for producing a granular solid material shown in FIG. 1, and is explained below according to the order of steps. First, the coal ash is collected in the electric dust collector 17, and a part thereof is sent to automatic coal ash sampling-analyzing unit 34. In the automatic coal ash sampling-analyzing unit 34, the sampled coal ash is analyzed, and the analytical results are input into quality control unit 35. The quality control unit 35 calculates the corrected basicity and the reactivity index based on the input analytical results, and executes switching of silo switcher 18 on the basis of thus derived values. More specifically, the silo switcher 18 executes the switching such that the coal ash as a raw ash is sent to raw ash silo 19 when the coal ash has a corrected basicity (($CaO+Fe_2O_3+MgO$)/$SiO_2$ (weight ratio)) of no less than 0.1 and a reactivity index (corrected basicity/$(R_2O/Al_2O_3)^2$ (weight ratio)) of no less than 10, while the remaining coal ash is sent to waste ash silo 20. Also in this embodiment, when the analysis and the calculation in the quality control unit 35 cannot be completed until the coal ash reaches the silo switcher 18, any construction may be made to provide an intermediate hopper (not shown in the figure) between the electric dust collector 17 and the silo switcher 18 to temporarily reserve the coal ash. Alternatively, any construction in which the coal ash is reserved in the silo 19 or the silo 20 before the results of the analysis and calculation are derived, and the coal ash is taken as the raw ash from the silo that reserves only the coal ash that exhibits the analysis and calculation results falling within the predetermined range described above is also acceptable.

Next, the raw ash in the raw ash silo 19 is weighed just a predetermined amount in weigh scale 26, and placed into kneading machine 28. Subsequently, lime from lime hopper 21, and gypsum from gypsum hopper 22 are weighed just a predetermined amount in the weigh scales 24 and 25, respectively, which are charged into the kneading machine 28. Next, the amount of water for kneading is determined based on the calibration curve shown in FIG. 3, and the corrected basicity of the raw ash derived from the analysis and calculation in the quality control unit 35. The water for kneading is charged into kneading machine 28 from water tank 23 using pump 27 as determined based on the calibration curve. In this process, the value of the agitator motive power of the kneading machine 28 is transmitted to the quality control unit 35, and then verification is made as to whether or not the ratio of (average of motive power during 30 to 40 sec after completion of charging water)/(motive power in idle operation) is 3 to 4, and the ratio of (fluctuation of motive power)/(average of motive power) is 0.1 to 0.3 with respect to in the agitator motive power per unit weight of the kneaded material for a period of time from 30 to 90 sec after completion of charging the water. When the aforementioned two kinds of ratios deviate from each range described above, the amount of the charged water for kneading is regulated in the subsequent batch such that both of the aforementioned two ratios fall with in the above range. When the aforementioned two ratios fall within the above range, merely fine adjustment of the amount of the charged water for kneading is carried out in the subsequent batch, based on the motive power in the previous batch. Accordingly, the kneaded material in the funicular state can be obtained stably.

Next, the kneaded material turned to have the funicular state is fed to vibration molding machine 29 to subject to vibration molding, followed by immediate demolding. The vibration molding is carried out by applying vibration with an amplitude of 0.1 to 2 mm, at a vibration frequency of 30 to 90 times/sec for 10 to 40 sec. Accordingly, the kneaded material is molded to give a block shape.

Next, the kneaded material subjected to the vibration molding is carried into curing machine 30. In the curing machine 30, the kneaded material in the funicular state is stood in a steam atmosphere of about 60° C., and the curing by water steaming is allowed for 24 to 36 hrs. Thus, a solid material is obtained from the kneaded material by a solidifying reaction.

Subsequently, the solid material after curing taken out from the curing machine 30 is first crushed using primary crushing machine 31. Then, the crushed material is classified into two grades of the granules falling with the particle size range of no less than 40 mm, and less than 40 mm with sieve machine 32. Thereafter, those having a particle size of no less than 40 mm are charged into secondary crushing machine 33, and subjected to secondary pulverization. Those yielded by secondary crushing, and those having a particle size of less than 40 mm are combined, whereby the granular solid material corresponding to crusher run C-40 can be obtained.

EXAMPLES

Using coal ash A sorted based on the composition of the ash content in coal, coal ash B sorted by automatic sampling/analysis with a pneumatic tube for coal ash, and coal ash C in the waste ash silo, production tests of granular solid materials were performed. Properties of the coal ash A, B and C are shown in Table 1.

TABLE 1

|  |  | Coal ash A | Coal ash B | Coal ash C |
|---|---|---|---|---|
| 50% mean diameter μm | | 29 | 21 | 25 |
| Blaine specific surface area (cm²/g) | | 2740 | 4070 | 2280 |
| Ignition loss (% by weight) | | 1.40 | 1.30 | 1.0 |
| Composition (% by weight) | $SiO_2$ | 60.1 | 53.0 | 61.2 |
| | $Al_2O_3$ | 22.9 | 24.5 | 12.9 |
| | CaO | 3.50 | 9.11 | 9.79 |
| | $Fe_2O_3$ | 4.72 | 5.05 | 6.16 |
| | MgO | 1.33 | 0.83 | 1.81 |
| | $Na_2O$ | 0.65 | 0.45 | 1.95 |
| | $K_2O$ | 1.24 | 0.38 | 0.92 |
| | $SO_3$ | 0.35 | 0.84 | 1.07 |
| | $CO_3$ | <0.10 | <0.10 | <0.10 |
| Corrected basicity | | 0.159 | 0.288 | 0.290 |
| Reactivity index | | 37.065 | 353.4 | 7.4 |

The conditions for producing the granular solid material in each Examples and each Comparative Examples below are summarized in Table 2. In addition, the granular solid material of each Examples and each Comparative Examples was evaluated on the unconfined compressive strength, crushed stone for mechanical stabilization, abrasion loss, corrected CBR (Carifornia Bearing Ratio) and with the deleterious heavy metal elution test (notification of the Environment Agency No. 46). The results are also shown in Table 2 together. The unconfined compressive strength was evaluated according to JIS R 5201, and the crushed stone for mechanical stabilization, the abrasion loss and the corrected CBR were evaluated according to a handbook of paving test methods.

Example 1

After weighing 300 kg of the coal ash A, 15 kg of quick lime, and 7.5 kg of gypsum on a weigh scale, they were charged in a kneading machine. Based on the relationship of the appropriate amount of the water for kneading versus the corrected basicity of the coal ash shown in FIG. 3, 90 kg of water was charged over 1 min, and the mixture was kneaded for 30 sec. In this procedure, the ratio of (average of motive power during 30 to 40 sec after completion of charging water)/(motive power in idle operation) with respect to the agitator motive power per unit weight of the kneaded material was 3.4. Furthermore, the ratio of (fluctuation of motive power)/(average of motive power) with respect to the agitator motive power per unit weight of the kneaded material for a period of time from 30 to 90 sec after completion of charging the water was 0.15. Next, after kneading for 30 sec, the mixture was withdrawn, and the kneaded material in the funicular state was placed in a mold form of a vibration molding machine. The mold form was subjected to vibration with an amplitude of 0.3 mm, at a vibration frequency of 50 times/sec for 30 sec to perfect molding to give a block shape of 300×300×200 mm, followed by immediate demolding. Next, curing was carried out under a steam atmosphere at 60° C. for 36 hrs to obtain a solid material.

The measurement of the compression strength of this solid material in this step revealed a value of 15 N/mm² (permissible value: no less than 12 N/mm²). This solid material was crushed with an impact type primary crushing machine, and classified with a sieve machine into those having a particle size of no less than 40 mm and those having a particle size of less than 40 mm. After those having a particle size of no less than 40 mm were crushed with an impact type secondary crushing machine, the resultants were combined with those having a particle size of less than 40 mm on a conveyer to obtain a granular solid material.

The particle size of the granular solid material in this Example satisfied the crusher run C-40, and also satisfied the base course material standards with the abrasion loss of 33% (permissible value: no greater than 50%), and the corrected CBR of 102% (permissible value: no less than 80%). Furthermore, the amount of elution of deleterious heavy metals and the like according to the elution test (notification of the Environment Agency No. 46) satisfied the environmental quality standards for soil.

Next, using the same compounding ratio as that described above, kneading was carried out with the amount of the water for kneading of 92 kg (without using reference of the calibration curve shown in FIG. 3), followed by the second, third, and fourth runs, whereby a granular solid material was produced under the same conditions as those described above. In this procedure, the ratio of (average of motive power during 30 to 40 sec after completion of charging water)/(motive power in idle operation) with respect to the agitator motive power per unit weight of the kneaded material was 3.4 to 3.6, and the ratio of (fluctuation of motive power)/(average of motive power) with respect to the agitator motive power per unit weight of the kneaded material for a period of time from 30 to 90 sec after completion of charging the water was 0.16 to 0.19.

The particle size of thus obtained granular solid material satisfied the crusher run C-40, with the abrasion loss being 31 to 34% and the corrected CBR being 100 to 104%, and also satisfied the environmental quality standards for soil with respect to the amount of elution of deleterious heavy metals and the like.

Example 2

Into a kneading machine equipped with a load cell were charged while weighing sequentially 300 kg of the coal ash B, 20 kg of slaked lime and 7.5 kg of gypsum. As determined from the calibration curve shown in FIG. 3, 82 kg of water was charged over 1 min, and the mixture was kneaded for 30 sec. In this procedure, the ratio of (average of motive power during 30 to 40 sec after completion of charging water)/(motive power in idle operation) with respect to the agitator motive power per unit weight of the kneaded material was 3.2. Furthermore, the ratio of (fluctuation of motive power)/(average of motive power) with respect to the agitator motive power per unit weight of the kneaded material for a period of time from 30 to 90 sec after completion of charging the water was 0.16. Next, after kneading for 30 sec, the mixture was withdrawn, and the kneaded material in the funicular state was placed in a mold form of a vibration molding machine. The mold form was subjected to vibration with an amplitude of 0.3 mm, at a vibration frequency of 50 times/sec for 30 sec to perfect molding to give a block shape of 300×300×200 mm, followed by immediate demolding. Next, curing was carried out under a steam atmosphere at 60° C. for 36 hrs to obtain a solid material.

The measurement of the compression strength of this solid material in this step revealed a value of 21 N/mm². This solid material was crushed with an impact type primary crushing machine, and classified with a sieve machine into three grades of granules falling within the particle size range of: no less than 40 mm; less than 40 mm and no less than 20 mm; and less than and 20 mm. Those having a particle size of no less than 40 mm were returned back to the impact type primary crushing machine again, while those having a particle size of no greater than 20 mm were divided into two halves with a dispensing machine, and one half was crushed with a secondary crushing machine, which were combined with those not subjected to secondary crushing having a particle size of less than 40 mm and no less than 20 mm, and those less than 20 mm on a conveyer to obtain a granular solid material.

The particle size of the granular solid material in this Example satisfied the crushed stone for mechanical stabilization M-40, and also satisfied the base course material standards with the abrasion loss of 30%, and the corrected CBR of 138%. Furthermore, the amount of elution of deleterious heavy metals and the like according to the elution test (notification of the Environment Agency No. 46) satisfied the environmental quality standards for soil.

Example 3

Into a kneading machine equipped with a load cell were charged while weighing sequentially 300 kg of the coal ash B, 20 kg of slaked lime and 7.5 kg of gypsum. As determined from the calibration curve shown in FIG. 3, 82 kg of water was charged over 1 min, and the mixture was kneaded for 30 sec. In this procedure, the ratio of (average of motive power during 30 to 40 sec after completion of charging water)/(motive power in idle operation) with respect to the agitator motive power per unit weight of the kneaded material was 3.3. Furthermore, the ratio of (fluctuation of motive power)/(average of motive power) with respect to the agitator motive power per unit weight of the kneaded material for a period of time from 30 to 90 sec after completion of charging the water was 0.17. Next, after kneading for 30 sec, the mixture was withdrawn, and the kneaded material in the funicular state was placed in a mold form of a vibration molding machine. The mold form was subjected to vibration with an amplitude of 0.3 mm, at a vibration frequency of 50 times/sec for 30 sec to perfect molding to give a block shape of 300×300×200 mm, followed by immediate demolding. Next, curing was carried out under a steam atmosphere at 60° C. for 36 hrs to obtain a solid material.

The measurement of the compression strength of this solid material in this step revealed a value of 20 N/mm². This solid material was crushed with an impact type primary crushing machine, and classified with a sieve machine into the range of no less than 20 mm and less than 20 mm. Those having a particle size of no less than 20 mm were returned back to the secondary crushing machine and crushed again, while those less than 20 mm were crushed with the secondary crushing machine, which were combined on a conveyer to obtain a granular solid material.

This granular solid material had a particle size of no greater than 10 mm. The corrected CBR of the granular solid material was 71%, and satisfied the standards for refilling materials and backfilling materials. Moreover, the amount of elution of deleterious heavy metals and the like determined according to the elution test of deleterious heavy metals and the like (notification of the Environment Agency No. 46) satisfied the environmental quality standards for soil.

Comparative Example 1

After weighing 300 kg of the coal ash A, 15 kg of quick lime, and 7.5 kg of gypsum on a weigh scale, they were charged in a kneading machine. To provide water in an amount below the appropriate amount of the water for kneading based on the relationship with the corrected basicity of the coal ash shown in FIG. 3, 79 kg of water was charged over 1 min, and the mixture was kneaded for 30 sec. In this procedure, the ratio of (average of motive power during 30 to 40 sec after completion of charging water)/(motive power in idle operation) with respect to the agitator motive power per unit weight of the kneaded material was 2.2. Furthermore, the ratio of (fluctuation of motive power)/(average of motive power) with respect to the agitator motive power per unit weight of the kneaded material for a period of time from 30 to 90 sec after completion of charging the water was 0.06. Next, after kneading for 30 sec, the mixture was withdrawn, and the kneaded material in the pendular state was placed in a mold form of a vibration molding machine. The mold form was subjected to vibration with an amplitude of 0.3 mm, at a vibration frequency of 50 times/sec for 30 sec to perfect molding to give a block shape of 300×300×200 mm, followed by immediate demolding. Next, curing was carried out under a steam atmosphere at 60° C. for 36 hrs to obtain a solid material.

The measurement of the compression strength of this solid material in this step revealed a value of 9 N/mm². This solid material was crushed with an impact type primary crushing machine, and classified with a sieve machine into those having a particle size of no less than 40 mm and those having a particle size of less than 40 mm. After those having a particle size of no less than 40 mm were crushed with an impact type secondary crushing machine, the resultants were combined with those having a particle size of less than 40 mm on a conveyer to obtain a granular solid material.

Although the particle size of the granular solid material in this Example satisfied the crusher run C-40, the base course material standards were not satisfied, with the abrasion loss being 56%, and the corrected CBR being 75%. Furthermore, the amount of elution of deleterious heavy metals and the like according to the elution test (notification of the Environment Agency No. 46) did not satisfy the environmental quality standards for soil.

Comparative Example 2

After weighing 300 kg of the coal ash C, 15 kg of quick lime, and 7.5 kg of gypsum on a weigh scale, they were charged in a kneading machine. As determined from the calibration curve shown in FIG. 3, 84 kg of water was charged over 1 min, and the mixture was kneaded for 30 sec. In this procedure, the ratio of (average of motive power during 30 to 40 sec after completion of charging water)/(motive power in idle operation) with respect to the agitator motive power per unit weight of the kneaded material was 3.2. Furthermore, the ratio of (fluctuation of motive power)/(average of motive power) with respect to the agitator motive power per unit weight of the kneaded material for a period of time from 30 to 90 sec after completion of charging the water was 0.17. Next, after kneading for 30 sec, the mixture was withdrawn, and the kneaded material in the funicular state was placed in a mold form of a vibration molding machine. The mold form was subjected to vibration with an amplitude of 0.3 mm, at a vibration frequency of 50 times/sec for 30 sec to perfect molding to give a block shape of 300×300×200 mm, followed by immediate demolding. Next, curing was carried out under a steam atmosphere at 60° C. for 36 hrs to obtain a solid material.

The measurement of the compression strength of this solid material in this step revealed a value of 7 N/mm². This solid material was crushed with an impact type primary crushing machine, and classified with a sieve machine into three grades of granules falling within the particle size range of: no less than 40 mm; less than 40 mm and no less than 20 mm; and less than and 20 mm. Those having a particle size of no less than 40 mm were returned back to the primary crushing machine and crushed again, while those having a particle size of no greater than 20 mm were divided into two halves with a dispensing machine, and one half was crushed with a secondary crushing machine, followed by combining on a conveyer to obtain a granular solid material.

Although the particle size of the granular solid material in this Example satisfied the crushed stone for mechanical stabilization M-40, the base course material standards were not satisfied, with the abrasion loss being 59%, and the corrected CBR being 68%. Furthermore, the amount of elution of deleterious heavy metals and the like according to the elution test (notification of the Environment Agency No. 46) did not satisfy the environmental quality standards for soil.

Comparative Example 3

Into a kneading machine equipped with a load cell were charged while weighing sequentially 300 kg of the coal ash B, 20 kg of slaked lime and 7.5 kg of gypsum. As determined from the calibration curve shown in FIG. 3, 84 kg of water was charged over 1 min, and the mixture was kneaded for 30 sec. In this procedure, the ratio of (average of motive power during 30 to 40 sec after completion of charging water)/(motive power in idle operation) with respect to the agitator motive power per unit weight of the kneaded material was 3.3. Furthermore, the ratio of (fluctuation of motive power)/(average of motive power) with respect to the agitator motive power per unit weight of the kneaded material for a period of time from 30 to 90 sec after completion of charging the water was 0.15. Next, after kneading for 30 sec, the mixture was withdrawn, and the kneaded material in the funicular state was placed in a mold form of a conventionally known low pressure vibration molding machine. When low pressure vibration molding was carried out, the molded product adhered to the loading plate in immediate demolding. Therefore, the molded product could not be sent to the following process, and thus formation of the solid material failed.

Example 4

The solid material of Example 2 was crushed with an impact type primary crushing machine, and classified with a sieve machine into three grades of granules falling within the particle size range of: no less than 40 mm; less than 40 mm and no less than 20 mm; and less than and 20 mm. Those having a particle size of no less than 40 mm were returned back to the primary crushing machine again, while those having a particle size of no greater than 20 mm were divided into two fractions of ⅕ and ⅘ (i.e., ratio of 1:4) with a dispensing machine, and the larger fraction (⅘) was crushed with a secondary crushing machine, followed by combining on a conveyer to obtain a granular solid material. Although the particle size of the granular solid material in this Example almost satisfied the crushed stone for mechanical stabilization M-40, the base course material standards were not satisfied, M-40 was not satisfied in some batches.

TABLE 2

|  | Example 1 | Example 2 | Example 3 | Example 4 |
|---|---|---|---|---|
| Coal ash A | 300 Kg |  |  |  |
| Coal ash B |  | 300 Kg | 300 Kg | 300 Kg |
| Coal ash C |  |  |  |  |
| Corrected basicity | 0.159 | 0.288 | 0.288 | 0.288 |
| Reactivity index | 37.065 | 353.4 | 353.4 | 353.4 |
| Quick lime/ | 15.0 Kg | 20.0 Kg | 20.0 Kg | 20.0 Kg |
| Gypsum | 7.5 Kg | 7.5 Kg | 7.5 Kg | 7.5 Kg |
| Amount of water for kneading/time (in the second and the subsequent runs) | 90 Kg/min (92 Kg/min) | 82 Kg/min | 82 Kg/min | 82 Kg/min |
| Kneading time | 5 min | 5 min | 5 min | 5 min |
| Initial 30-40 sec average/idling motive power (average of date from second, third, and fourth runs) | 3.4 (3.4-3.6) | 3.2 | 3.3 | 3.3 |
| Motive power amplitude/motive power average (average of date from second, third, and fourth runs) | 0.15 (0.16-0.19) | 0.16 | 0.17 | 0.17 |
| Amplitude in molding | 0.3 mm | 0.3 mm | 0.3 mm | 0.3 mm |
| Vibration Frequency | 50 times/sec for 30 sec | 50 times/sec for 30 sec | 50 times/sec for 30 sec | 50 times/sec for 30 sec |
| Molded shape (mm) | 300 × 300 × 200 | 300 × 300 × 200 | 300 × 300 × 200 | 300 × 300 × 200 |
| Curing | 60° C. × 36 Hr | 60° C. × 36 Hr | 60° C. × 36 Hr | 60° C. × 36 Hr |
| Uniaxial compression strength (permissible value: no less than 12 N/mm$^2$) | 15 N/mm$^2$ | 21 N/mm$^2$ | 20 N/mm$^2$ | 20 N/mm$^2$ |
| Sieve | 1) 40 mm <, 2) 40 mm >, | 1) 40 mm <, 2) 20-40 mm, 3) 20 mm > | 1) 20 mm <, 2) 20 mm >, | 1) 40 mm <, 2) 20-40 mm. 3) 20 mm > |
| Pulverization | Pulverization from 1) 40 mm < to 40 mm > | Pulverization from 40 mm < to 1) 20-40 mm, and pulverization of 2) half of 20 mm > | Pulverization from 1) 20 mm < to 20 mm > and from 2) 20 mm> | Pulverization from 40 mm < to 1) 20-40 mm, and pulverization of 2) 4/5 of 20-40 mm |
| crushed stone for mechanical stabilization (second, third, and fourth runs) | C-40 satisfied (same as above) | M-40 satisfied | Average particle size No greater than 10 mm | M-40 not satisfied in some batches |
| Abrasion loss (average of second, third, and fourth runs) (no greater than 50% of permissible value) | 33% 31-34% | 30% | — | — |
| Corrected CBR (average of second, third, and fourth runs) (no less than 80% of permissible value) | 102% 100-104% | 138% | 71% | — |

TABLE 2-continued

| Deleterious heavy metal, etc | Standard level or less | Standard level or less | Standard level or less | Standard level or more |
|---|---|---|---|---|
| | | Comparative Example 1 | Comparative Example 2 | Comparative Example 3 |
| Coal ash A | | 300 Kg | | |
| Coal ash B | | | | 300 Kg |
| Coal ash C | | | 300 Kg | |
| Corrected basicity | | 0.159 | 0.290 | 0.288 |
| Reactivity index | | 37.065 | 7.4 | 353.4 |
| Quick lime/ | | 15.0 Kg | 15.0 Kg | 20.0 Kg |
| Gypsum | | 7.5 Kg | 7.5 Kg | 7.5 Kg |
| Amount of water for kneading/time (in the second and the subsequent runs) | | 79 Kg/min | 84 Kg/min | 84 Kg/min |
| Kneading time | | 5 min | 5 min | 5 min |
| Initial 30-40 sec average/idling motive power (average of date from second, third, and fourth runs) | | 2.2 | 3.2 | 3.3 |
| Motive power amplitude/motive power average (average of date from second, third, and fourth runs) | | 0.06 | 0.17 | 0.15 |
| Amplitude in molding | | 0.3 mm | 0.3 mm | Low-pressure vibration molding |
| Vibration Frequency | | 50 times/sec for 30 sec | 50 times/sec for 30 sec | |
| Molded shape (mm) | | 300 × 300 × 200 | 300 × 300 × 200 | (Adhesion to loading plate, molding failed |
| Curing | | 60° C. × 36 Hr | 60° C. × 36 Hr | |
| Uniaxial compression strength (permissible value: no less than 12 N/mm$^2$) | | 9 N/mm$^2$ | 7 N/mm$^2$ | — |
| Sieve | | 1) 40 mm <, 2) 40 mm >, | 1) 40 mm <, 2) 20-40 mm, 3) 20 mm > | |
| Pulverization | | Pulverization from 1) 40 mm < to 40 mm >, and and pulverization of 2) 40 mm> | Pulverization from 40 mm < to 1) 20-40 mm, and pulverization of 2) half of 20 mm > e | |
| crushed stone for mechanical stabilization (second, third, and fourth runs) | | C-40 satisfied | M-40 satisfied | — |
| Abrasion loss (average of second, third, and fourth runs) (no greater than 50% of permissible value) | | 56% | 59% | — |
| Corrected CBR (average of second, third, and fourth runs) (no less than 80% of permissible value) | | 75% | 68% | — |
| Deleterious heavy metal, etc | | Standard level or more | Standard level or more | — |

INDUSTRIAL APPLICABILITY

According to the process for producing a granular solid material from coal ash as a raw material and the apparatus of the present invention, elution of deleterious metals can be avoided, and a granular solid material having a sufficient strength can be obtained. Therefore, this process can be utilized in the field of roadbed materials, embankment materials, refilling materials, backfilling materials, soil improving materials, humidity conditioning materials for use in green houses and underfloors, and the like.

The invention claimed is:
1. A process for producing a granular solid material comprising:
    adding lime and/or gypsum as an additive to a coal ash;
    kneading with water;
    carrying out molding;
    curing with steaming to allow for solidifying; and
    crushing to obtain a granular solid material, wherein the coal ash has a corrected basicity (($CaO+Fe_2O_3+MgO$)/$SiO_2$ (weight ratio)) of no less than 0.1, and a reactivity index (corrected basicity/($R_2O/Al_2O_3$)2 (weight ratio)) of no less than 10.
2. A process for producing a granular solid material, the process comprising:
    (a) sorting as a raw ash a coal ash having a corrected basicity (($CaO+Fe_2O_3+MgO$)/$SiO_2$ (weight ratio)) of no less than 0.1, and a reactivity index (corrected basicity/($R_2O/Al_2O_3$)2 (weight ratio)) of no less than 10;
    (b) adding lime and/or gypsum to the raw ash and mixing them;
    (c) adding water for kneading to the mixture, and kneading using a kneading machine to obtain a kneaded material, wherein the amount of charged water for kneading is controlled such that a ratio of (average of motive power during 30 to 40 sec after completion of charging water)/(motive power in idle operation) is 3 to 4 with respect to the agitator motive power per unit weight of the kneaded material in the kneading machine, and a ratio of (fluctuation of motive power)/(average of motive power) is

0.1 to 0.3 with respect to the agitator motive power per unit weight of the kneaded material for a period of time from 30 to 90 sec after completion of charging the water are attained, whereby a kneaded material in the funicular state is obtained;

(d) carrying out molding by placing the kneaded material in the funicular state into a mold form to subject to vibration molding, followed by demolding;

(e) curing by steaming to obtain a solid material; and (f) crushing the solid material and adjusting the particle size.

3. The process for producing a granular solid material according to claim 2 further comprising the step of determining the amount of the charged water for kneading beforehand by carrying out kneading of the mixture obtained in the step (b) in the kneading machine using the water for kneading as defined based on the corrected basicity of the coal ash, which enables attaining the ratio of (average of motive power during 30 to 40 sec after completion of charging water)/(motive power in idle operation) being 3 to 4 with respect to the agitator motive power per unit weight of the kneaded material in the kneading machine, and the ratio of (fluctuation of motive power)/(average of motive power) being 0.1 to 0.3 with respect to the agitator motive power per unit weight of the kneaded material for a period of time from 30 to 90 sec after completion of charging the water, and the determined amount of the charged water for kneading is employed in the step (c).

4. The process for producing a granular solid material according to claim 2 wherein the kneaded material in the funicular state is placed into a mold form in the step (d), and subjected to molding to give a block shape by applying vibration with an amplitude of 0.1 to 2 mm, at a vibration frequency of 30 to 90 times/sec for 10 to 40 sec, followed by immediate demolding.

5. The process for producing a granular solid material according to claim 2 wherein after primary crushing of the solid material following curing is carried out in the step (f), the resultant is classified into three grades of granules falling within the particle size range of: no less than 25-40 mm; less than 25-40 mm and no less than 13-20 mm; and less than 13-20 mm, and then the granules classified into the grade of no less than 25-40 mm are crushed again, while 40 to 60% of the granules being less than 13-20 mm are subjected to secondary crushing, followed by mixing of the entirety to give the granular solid material.

6. The process for producing a granular solid material according to claim 2 wherein after primary crushing of the solid material following curing is carried out in the step (f), the resultant is classified into grades of the granules falling within the particle size range of no less than 10-40 mm, and less than 10-40 mm, and subsequently, the granules of no less than 10-40 mm are subjected to secondary crushing, followed by mixing of the entirety to give the granular solid material.

* * * * *

UNITED STATES PATENT AND TRADEMARK OFFICE
CERTIFICATE OF CORRECTION

PATENT NO. : 8,286,900 B2  
APPLICATION NO. : 12/447235  
DATED : October 16, 2012  
INVENTOR(S) : Noboru Takikawa et al.

Page 1 of 1

It is certified that error appears in the above-identified patent and that said Letters Patent is hereby corrected as shown below:

<u>On the Title Page:</u>

Item (73), the Assignees "Kawasaki Plant Systems Kabushiki Kaisha, Kobe-shi (JP); Japan Coal Energy Center, Tokyo (JP); Kawasaki Jukogyo Kabushiki Kaisha, Kobe-shi (JP)" should be --Japan Coal Energy Center, Tokyo (JP); Kawasaki Jukogyo Kabushiki Kaisha, Kobe-shi (JP)--

Signed and Sealed this
Twenty-first Day of July, 2015

Michelle K. Lee
*Director of the United States Patent and Trademark Office*